(12) United States Patent
Tamura

(10) Patent No.: US 6,188,383 B1
(45) Date of Patent: Feb. 13, 2001

(54) METHOD, APPARATUS AND COMPUTER PROGRAM FOR IMAGE RESOLUTION CONVERSION

(75) Inventor: Youichi Tamura, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/079,384

(22) Filed: May 15, 1998

(30) Foreign Application Priority Data

May 19, 1997 (JP) .................................................. 9-128319

(51) Int. Cl.$^7$ ....................................................... G09G 5/00
(52) U.S. Cl. .......................................... 345/132; 382/293
(58) Field of Search ................................... 345/132, 127, 345/3, 128, 129, 130, 131; 382/293, 298, 299

(56) References Cited

U.S. PATENT DOCUMENTS

| | | | | |
|---|---|---|---|---|
| 4,829,587 | * | 5/1989 | Glazer et al. ........................... | 382/47 |
| 4,870,661 | * | 9/1989 | Yamada et al. ....................... | 375/122 |
| 4,949,177 | * | 8/1990 | Bannister et al. .................... | 358/138 |
| 5,068,716 | | 11/1991 | Takayama et al. ..................... | 358/13 |
| 5,068,905 | * | 11/1991 | Hackett et al. ......................... | 382/47 |
| 5,179,641 | * | 1/1993 | Comins et al. ........................ | 395/132 |
| 5,208,871 | * | 5/1993 | Eschbach .............................. | 382/41 |
| 5,265,176 | * | 11/1993 | Miller .................................... | 382/47 |
| 5,276,790 | * | 1/1994 | Lo et al. ............................... | 395/142 |
| 5,452,374 | * | 9/1995 | Cullen et al. ......................... | 382/293 |
| 5,754,162 | * | 5/1998 | Cahill, III ............................. | 345/127 |
| 5,862,268 | * | 1/1999 | Boehlke ............................... | 382/299 |

FOREIGN PATENT DOCUMENTS

| | | |
|---|---|---|
| 2 100 092 | 12/1982 | (GB) . |
| 7-104710 | 4/1995 | (JP) . |
| 7-225565 | 8/1995 | (JP) . |
| 8-137444 | 5/1996 | (JP) . |
| 9-34411 | 2/1997 | (JP) . |
| 10-340338 | 12/1998 | (JP) . |

* cited by examiner

Primary Examiner—Vijay Shankar
Assistant Examiner—Vanel Frenel
(74) Attorney, Agent, or Firm—Young & Thompson

(57) ABSTRACT

An image resolution converting method, apparatus and computer program converts an input image having varying resolutions to an output image having varying resolutions, using only a single circuit. The method generates a common-coordinate system common to the input image and the output image by relating the number of pixels of the input image to the number of pixels of the output image, calculates an absolute-coordinate of the pixel of the input image and the pixel of the output image, and calculates a pixel value of the output image from the value of a corresponding pixel of the input image using the absolute-coordinates of the output image. A vertical common multiple and horizontal common multiple technique allow integral expression of how far an arbitrary line/dot of the matrix display device is from each of the lines/dots of the input image signals. Using linear interpolation, it is possible to display input image signals having varying resolutions on a matrix display device having a fixed resolution, without lacking pixel information which should be displayed on the matrix display device and further to display the input images scaled up and down on the matrix display device.

12 Claims, 10 Drawing Sheets

Fig.9

| LINE NUMBER L OF THE OUTPUT IMAGE DATA D_out | OPERATIONS OF THE FIRST VERTICAL COUNTER $A_v$ AND THE SECOND VERTICAL COUNTER $B_v$ | CALCULATION OF PIXEL LUMINANCE $Y'(L) = (Y(B_v)*(599-A_v)+Y(B_v+1)*A_v)/599$ |
|---|---|---|
| 0 | $A_v = 0$<br>$B_v = 0$ | $Y'(0) = (Y(0)*599+Y(1)* 0)/599$ |
| 1 | $A_v = 0 + 479 - 0 = 479$<br>$B_v = 0 + 0 = 0$ | $Y'(1) = (Y(0)*120+Y(1)*479)/599$ |
| 2 | $A_v = 479 + 479 - 599 = 359$<br>$B_v = 0 + 1 = 1$ | $Y'(2) = (Y(1)*240+Y(2)*359)/599$ |
| 3 | $A_v = 359 + 479 - 599 = 239$<br>$B_v = 1 + 1 = 2$ | $Y'(3) = (Y(2)*360+Y(3)*239)/599$ |
| 4 | $A_v = 239 + 479 - 599 = 119$<br>$B_v = 2 + 1 = 3$ | $Y'(4) = (Y(3)*480+Y(4)*119)/599$ |
| 5 | $A_v = 119 + 479 - 0 = 598$<br>$B_v = 3 + 0 = 3$ | $Y'(5) = (Y(3)* 1+Y(4)*598)/599$ |
| 6 | $A_v = 598 + 479 - 599 = 478$<br>$B_v = 3 + 1 = 4$ | $Y'(6) = (Y(4)*121+Y(5)*478)/599$ |
| 7 | $A_v = 478 + 479 - 599 = 358$<br>$B_v = 4 + 1 = 5$ | $Y'(7) = (Y(5)*241+Y(6)*358)/599$ |
| 8 | $A_v = 358 + 479 - 599 = 238$<br>$B_v = 5 + 1 = 6$ | $Y'(8) = (Y(6)*361+Y(7)*238)/599$ |
| 9 | $A_v = 238 + 479 - 599 = 118$<br>$B_v = 6 + 1 = 7$ | $Y'(9) = (Y(7)*481+Y(8)*118)/599$ |
| .. | | |

Fig.10

| LINE NUMBER L OF THE OUTPUT IMAGE DATA Dout | OPERATIONS OF THE FIRST VERTICAL COUNTER A$_V$ AND THE SECOND VERTICAL COUNTER B$_V$ | CALCULATION OF PIXEL LUMINANCE $Y'(L) = (Y(B_V)*(599-A_V)+Y(B_V+1)*A_V)/599$ |
|---|---|---|
| 0 | A$_V$ = 0<br>B$_V$ = 0 | Y'(0) = (Y( 0)*599+Y( 1)*  0)/599 |
| 1 | A$_V$ = 0 + 767 − 599 − 0 = 168<br>B$_V$ = 0 + 1 + 0 = 1 | Y'(1) = (Y( 1)*431+Y( 2)*168)/599 |
| 2 | A$_V$ = 168 + 767 − 599 − 0 = 336<br>B$_V$ = 1 + 1 + 0 = 2 | Y'(2) = (Y( 2)*263+Y( 3)*336)/599 |
| 3 | A$_V$ = 336 + 767 − 599 − 0 = 504<br>B$_V$ = 2 + 1 + 0 = 3 | Y'(3) = (Y( 3)* 95+Y( 4)*504)/599 |
| 4 | A$_V$ = 504 + 767 − 599 − 599 = 73<br>B$_V$ = 3 + 1 + 1 = 5 | Y'(4) = (Y( 5)*526+Y( 6)* 73)/599 |
| 5 | A$_V$ = 73 + 767 − 599 − 0 = 241<br>B$_V$ = 5 + 1 + 0 = 6 | Y'(5) = (Y( 6)*358+Y( 7)*241)/599 |
| 6 | A$_V$ = 241 + 767 − 599 − 0 = 409<br>B$_V$ = 6 + 1 + 0 = 7 | Y'(6) = (Y( 7)*190+Y( 8)*409)/599 |
| 7 | A$_V$ = 409 + 767 − 599 − 0 = 577<br>B$_V$ = 7 + 1 + 0 = 8 | Y'(7) = (Y( 8)* 22+Y( 9)*577)/599 |
| 8 | A$_V$ = 577 + 767 − 599 − 599 = 146<br>B$_V$ = 8 + 1 + 1 = 10 | Y'(8) = (Y(10)*453+Y(11)*146)/599 |
| 9 | A$_V$ = 146 + 767 − 599 − 0 = 314<br>B$_V$ = 10 + 1 + 0 = 11 | Y'(9) = (Y(11)*285+Y(12)*314)/599 |
| .. | | |

METHOD, APPARATUS AND COMPUTER PROGRAM FOR IMAGE RESOLUTION CONVERSION

BACKGROUND OF THE INVENTION

1. Field of the Invention

The present invention relates to a method, apparatus and computer program for image resolution conversion, and especially for converting an input image having a first resolution to an output image having a second different resolution.

2. Description of Related Art

Many kinds of matrix display devices having fixed resolutions are known, for example, a liquid crystal display (LCD) device having a resolution of "640 dots (horizontal)× 480 lines (vertical)", a plasma display device having a resolution of "800 dots (horizontal)×600 lines (vertical)", etc. For displaying various kinds of input images having various resolutions on these matrix display devices having various resolutions, a method of performing twice-writing of pixels for scaling up the input images has been used and also a method of performing thinning out pixels for scaling down the input images has been used.

Japanese Kokai 7-104,710 (published on Apr. 21, 1995) and No. 8-137,444 (published on May 31, 1996) disclose multi-scanning display methods and apparatuses for a liquid crystal display using a technique, for example, when data of 5 pixels thin out to data of 4 pixels, the width of each pixel is magnified by 5/4, then the resulting data are averaged and outputted as output data of each pixel. These conventional methods and apparatuses have recently appeared which make it possible to cope with plural input images having different resolutions by providing plural circuits each of which converts a particular input resolution, and by selectively using one of these circuits.

Thus, the conventional resolution converting methods and apparatuses provide one dedicated resolution converting circuit for each input resolution, and switch over among the plural resolution converting circuits according to the resolution of an input image. Therefore, such methods have a disadvantage that these circuits must become large to cope with many input resolutions.

Moreover, each of the conventional resolution converting methods and apparatuses has a disadvantage in that a great number of resolution converting circuits must be individually prepared for magnifying a part of the matrix display device. In practice, it is difficult to smoothly scale up and down the input images.

SUMMARY OF THE INVENTION

An object of the present invention is to provide a method, apparatus and computer program for image resolution conversion which are capable of overcoming the above disadvantages, and particularly which are capable of converting an input image having various resolutions to an output image having various different resolutions using only a single circuit.

Another object of the present invention is to provide a method, apparatus and computer program for image resolution conversion capable of display-controlling a matrix display device having a fixed number of pixels by keeping input images of various resolutions, namely various image sizes, good in quality and capable of displaying the input images scaled up and down at multistage magnifications.

To realize the above objects, the present invention provides an image resolution converting method for converting an input image having a first resolution to an output image having a second different resolution comprising: generating a common-coordinate system common to the input image and the output image by referencing the number of pixels of the input image to the number of pixels of the output image, calculating an absolute-coordinate for each pixel of the input image and each pixel of the output image on the basis of the generated common-coordinate system, and calculating a value of a pixel of the output image from a value of a corresponding pixel of the input image with reference to the calculated absolute-coordinates of the output image.

The common-coordinate generating step generates coordinates used for handling each pixel of both the input image and the output image in the common-coordinate system, from the number of pixels of the output image and the number of pixels of the input image. For example, this process calculates a common multiple of the numbers of pixels of both images and represents pixel positions of both images by this common multiple. The absolute-coordinate calculating step obtains the coordinates of pixels of the output image by the common-coordinate system. It is thus possible to express in the absolute-coordinates how far each pixel of the output image is from its corresponding pixel of the input image, and further to obtain a ratio of a positional relation between pixels of the input image and pixels of the output image. The value calculating step obtains the value of a pixel of the output image from the absolute-coordinate of the pixel of the output image. For example, if a pixel of the output image is between two pixels of the input image, this step obtains the value of a pixel of the output image by performing a linear interpolation of the values of the two pixels of the input image based on the coordinates of these two pixels of the input image and the coordinate of the pixel of the output image. Thanks to this technique, the resolution conversion is high in quality even if both the number of pixels of the input image and the number of pixels of the output image are changing in various ways.

BRIEF DESCRIPTION OF THE DRAWINGS

FIG. 9 is a schematic diagram showing a scaling-up process in the vertical direction according to the second embodiment.

FIG. 10 is a schematic diagram showing a scaling-down process in the vertical direction according to the second embodiment.

DETAILED DESCRIPTION OF THE PREFERRED EMBODIMENTS

In the following description, a "pixel" is defined as a display unit of an input image data Din and/or an output image data Dout. A "line" is defined as the vertical position of the pixel of the input image data Din and/or the output image data Dout. A "dot" is defined as the horizontal position of the pixel of the input image data Din and/or the output image data Dout. "Resolution" is defined as a number of the lines and a number of the dots of the input image data Din and/or the output image data Dout.

Figure 1:
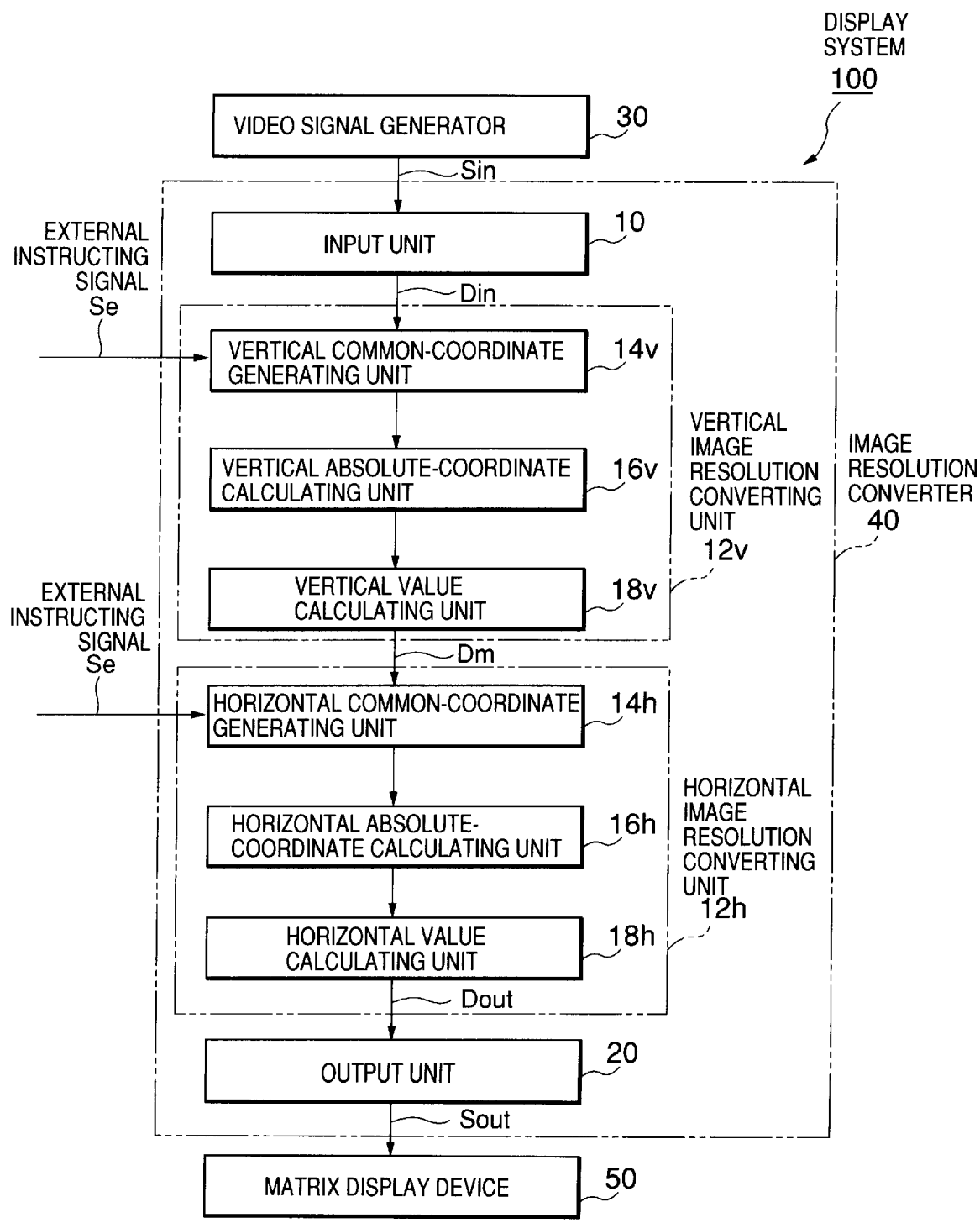
FIG. 1 is a block diagram showing the structure of an image resolution converting apparatus according to a first embodiment of the present invention.

In FIG. 1, a display system 100 has a video signal generator 30, an image resolution convertor 40, and a matrix display device 50.

The video signal generator 30 generates and outputs an input image signal Sin having a resolution "Nh dots (horizontal)×Nv lines (vertical)".

The image resolution convertor 40 converts the input image signal Sin having the resolution "Nh dots (horizontal)×Nv lines (vertical)" output from the video signal generator 30 to an output image signal Sout having a different resolution "Mh dots (horizontal)×Mv lines (vertical)".

The matrix display device 50 has a fixed resolution "Mh dots (horizontal)×Mv lines (vertical)" corresponding to the resolution of the output image signal Sout. The matrix display device 50 is, e.g. a liquid crystal display (LCD) device, a plasma display device, a light emitting diode (LED) array device, a fluorescent (FL) display device, a flip pixel display device or the like, which displays the output image signal Sout outputted by the image resolution convertor 40.

In FIG. 1, the image resolution convertor 40 has an input unit 10, a vertical image resolution converting unit 12$v$, a horizontal image resolution converting unit 12$h$, and an output unit 20.

The input unit 10 converts the input image signal Sin outputted by the video signal generator 30 and modulated as a video signal format, to input image data Din demodulated as pure image data.

The vertical image resolution converting unit 12$v$ converts the input image data Din having various resolutions to intermediate image data Dm having another resolution corresponding to the fixed number of lines of the matrix display device 50.

The horizontal image resolution converting unit 12$h$ converts the intermediate image data Dm to the output image data Dout having a still further resolution corresponding to the fixed number of lines and dots of the matrix display device 50.

The output unit 20 then converts the output image data Dout outputted by the horizontal image resolution converting unit 12$h$, which is pure image data, to an output image signal Sout which is in the proper format for driving the matrix display device 50.

In FIG. 1, the vertical image resolution converting unit 12$v$ has a vertical common-coordinate generating unit 14$v$, a vertical absolute-coordinate calculating unit 16$v$, and a vertical value calculating unit 18$v$. The vertical image resolution converting unit 12$v$ controls conversion of a vertical resolution by referencing the number Nv of lines of the input image data Din to the number Mv of lines of the output image data Dout in the vertical direction.

The vertical common-coordinate generating unit 14$v$ generates a vertical common-coordinate system common to the number Nv of the lines of the input image data Din and the number Mv of the lines of the output image data Dout corresponding to the number of lines of the matrix display device 50. The numbers Nv, Mv are supplied by an external instruction signal Se.

The vertical absolute-coordinate calculating unit 16$v$ calculates vertical absolute-coordinates of each line of the output image data Dout and a line of the input image data Din on the basis of the vertical common-coordinate system generated by the vertical common-coordinate generating unit 14$v$.

The vertical value calculating unit 18$v$ calculates the value of a line of the intermediate image data Dm from the value of a corresponding line of the input image data Din on the basis of the vertical absolute-coordinate of each line of the output image data Dout corresponding to each line of the matrix display device 50 calculated by the vertical absolute-coordinate calculating unit 16$v$.

In FIG. 1, in the same way, the horizontal image resolution converting unit 12$h$ has a horizontal common-coordinate generating unit 14$h$, a horizontal absolute-coordinate calculating unit 16$h$, and a horizontal value calculating unit 18$h$. The horizontal direction conversion control unit 12$h$ controls conversion of a horizontal resolution by referencing the number Nh of dots of an input image data Din to the number Mh of dots of an output image data Dout in the horizontal direction. The numbers Nh and Mh are designated by an external instructing signal Se.

The horizontal common-coordinate generating unit 14$h$ generates a horizontal common-coordinate system common to the number Nh of the dots of the intermediate image data Dm and the number Mh of the output image data Dout corresponding to the number of dots of the matrix display device 50.

The horizontal absolute-coordinate generating unit 16$h$ calculates horizontal absolute-coordinates of each dot of the matrix display device 50 and a dot of the intermediate image data Dm on the basis of the horizontal common-coordinate system generated by the horizontal common-coordinates generating unit 14$h$.

The horizontal value calculating unit 18$h$ calculates the value of a dot of the output image data Dout from the value of a corresponding dot of the input image data Din on the basis of the horizontal absolute-coordinate of each dot of the matrix display device 50 calculated by the horizontal absolute-coordinate calculating unit 16$h$.

For example, assume that an input image signal Sin having a variable number Nv of lines and a variable number Nh of dots is converted to input image data Din for use in the matrix display device 50 which is a matrix type display device having a fixed number Mv of lines and a fixed number Mh of dots. The image resolution convertor 40 performs a luminance computation by dividing the vertical direction by a vertical common multiple Cv of (Nv−1) and (Mv−1) and dividing the horizontal direction by a horizontal common multiple Ch of (Nh−1) and (Mh−1). By dividing the vertical direction by a vertical common multiple Cv of (Nv−1) and (Mv−1) and the horizontal direction by the horizontal common multiple Ch of (Nh−1) and (Mh−1), it can be expressed in integers how far an arbitrary line/dot of the matrix display device 50 is from each of the lines/dots of the input image signals Sin. In addition to this, by using a linear interpolation or the like, it is possible to display input image signals Sin having various resolutions on a matrix display device 50 having a fixed resolution, without lacking pixel information which should be displayed on the matrix display device 50, and further to display the input images scaled up or down on the matrix display device 50.

To convert both the vertical and the horizontal resolution at the same time, a value in the vertical direction is first obtained. This is not the value of a pixel of an actual output image, but instead is the value of an intersecting point of a horizontal dot of the input image data Din and a vertical line of the output image data Dout. Next, a value in the horizontal direction is obtained on the basis of this value. This value becomes a value of the output image data Dout. Of course, a horizontal value may be calculated first instead of first calculating a vertical value.

Figure 2:
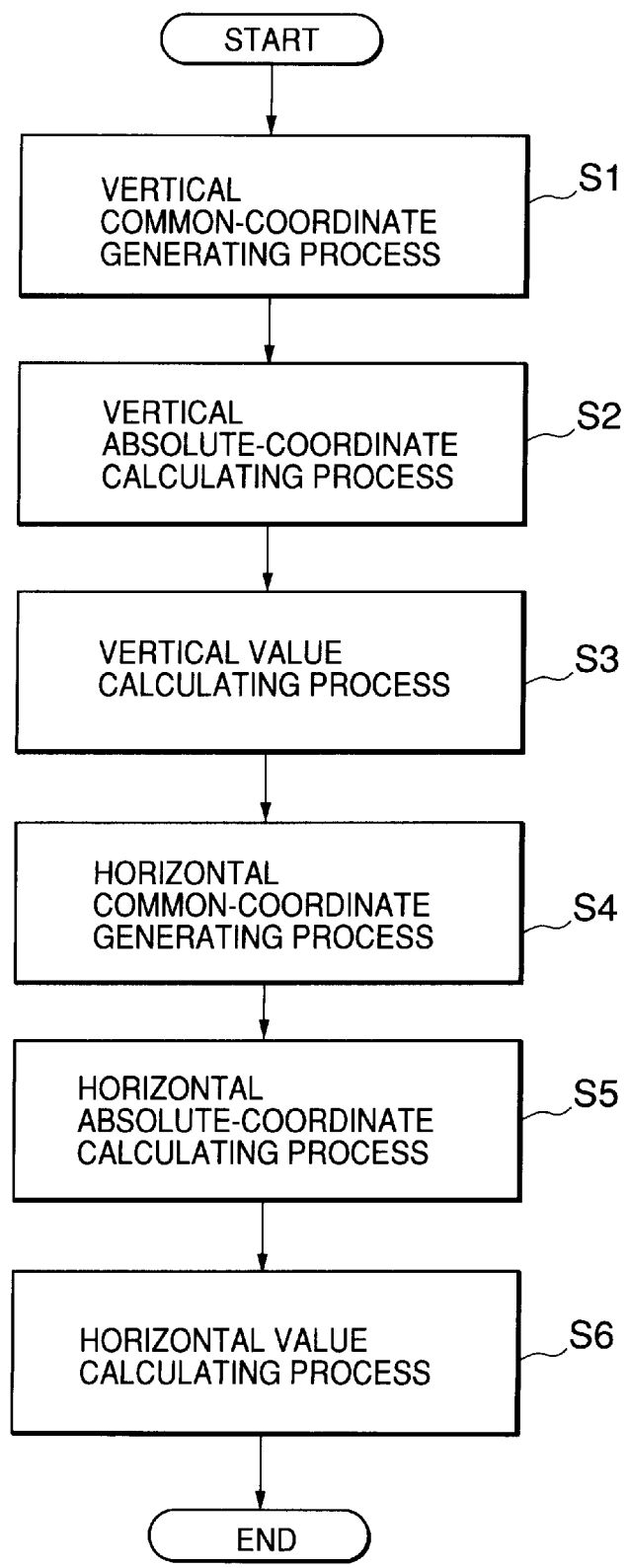
FIG. 2 is a flowchart showing a method of image resolution conversion according to the first embodiment.

In FIG. 2, the vertical common-coordinate generating process (step S1) generates a vertical coordinate system common to the input image data Din and the output image data Dout by referencing the number Nv of lines of the input image data Din to the number Mv of lines of the output image data Dout.

The vertical absolute-coordinate calculating process (step S2) calculates vertical absolute-coordinates of each line of the output image data Dout and a line of the input image data Din on the basis of the vertical common-coordinate system generated in the vertical common-coordinate generating process (step S1).

The vertical value calculating process (step S3) calculates the value of a line of the output image data Dout from the value of a corresponding line of the input image data Din on the basis of the absolute-coordinates of the output image data Dout calculated in the vertical absolute-coordinate calculating process (step S2).

The horizontal common-coordinate generating process (step S4) generates a horizontal coordinate system common to the input image data Din and the output image data Dout by referencing the number Nh of dots of the input image data Din to the number Mh of dots of the output image data Dout.

The horizontal absolute-coordinate calculating process (step S5) calculates absolute-coordinates of each dot of the output image data Dout and a dot of the input image data Din on the basis of the horizontal common-coordinate system generated in the horizontal common-coordinate generating process (step S4).

The horizontal value calculating process (step S6) calculates the value of a dot of the output image data Dout from the value of a corresponding dot of the input image data Din on the basis of the horizontal absolute-coordinates of the output image data Dout calculated in the horizontal absolute-coordinate calculating process (step S5).

In this embodiment, the vertical common-coordinate generating process (step S1) includes a vertical common-multiple calculating process of calculating as a common image a common multiple of the number Nv of lines of an input image data Din and the number Mv of lines of an output image data Dout. This process allows lines of the input image data Din and lines of the output image data Dout to be processed in integer coordinates. In the same way, the horizontal common-coordinate generating process (step S4) includes a horizontal common-multiple calculating process of the number Nh of dots of the input image data Din and the number Mh of dots of the output image data Dout.

The vertical value calculating process (step S3) preferably includes specifying a value of the output image data Dout by a linear interpolation method or the like between lines of the input image data Din based on the absolute-coordinates of lines of the output image data Dout corresponding to lines of the input image data Din. By obtaining the value of a line of the output image data Dout in this manner, it is possible to perform an image resolution conversion without deterioration of image quality. In the same way, the horizontal value calculating process (step S6) preferably includes specifying a value of the output image data Dout by a linear interpolation or the like.

According to the image resolution converting method shown in FIG. 2, it is possible to perform an optimum resolution conversion according to the respective resolutions without limiting in advance the resolution of an input image data Din. Thanks to this, this method is suitable, for example, for an image resolution conversion in case of displaying an input image data Din having plural resolutions, on a matrix display device 50 having a fixed number of lines Mv and dots Mh.

Figure 3:
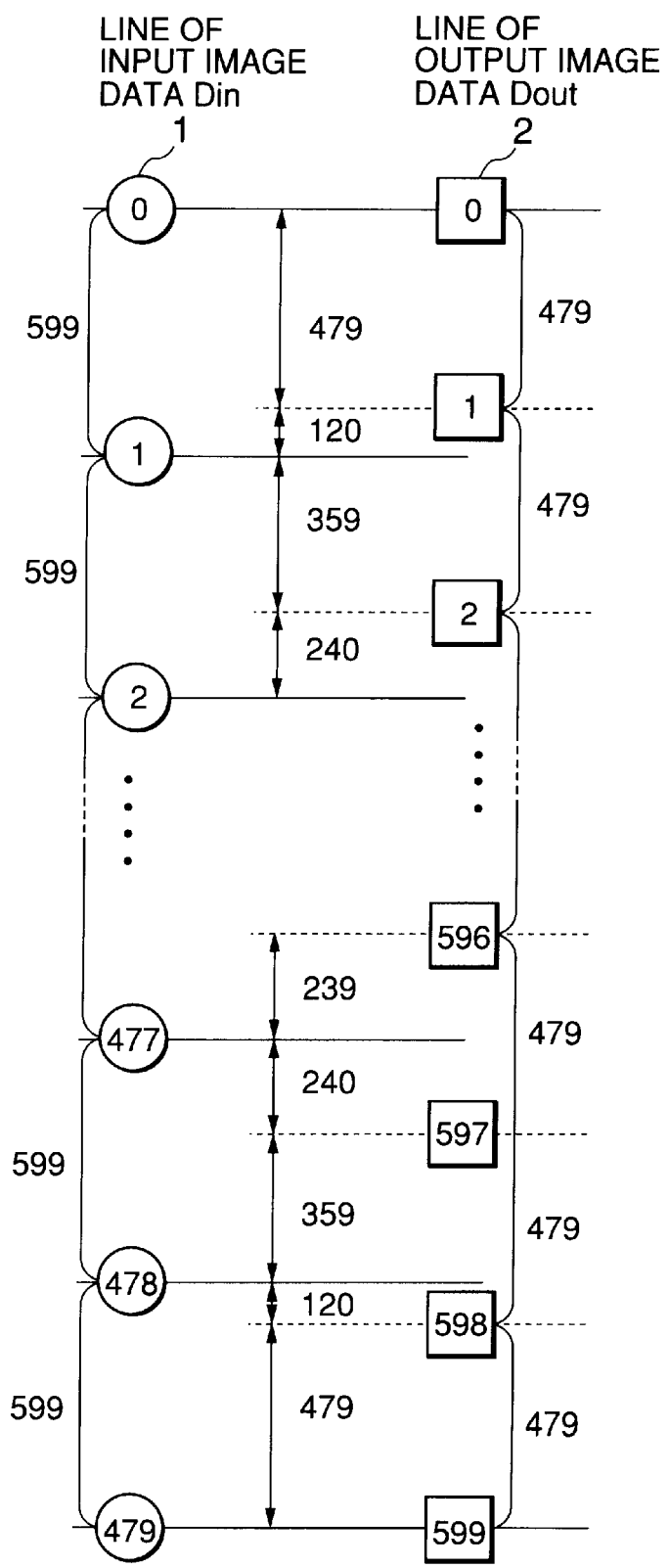
FIG. 3 is a schematic diagram showing a vertical resolution conversion for scaling up an input image according to the first embodiment.
Figure 4:
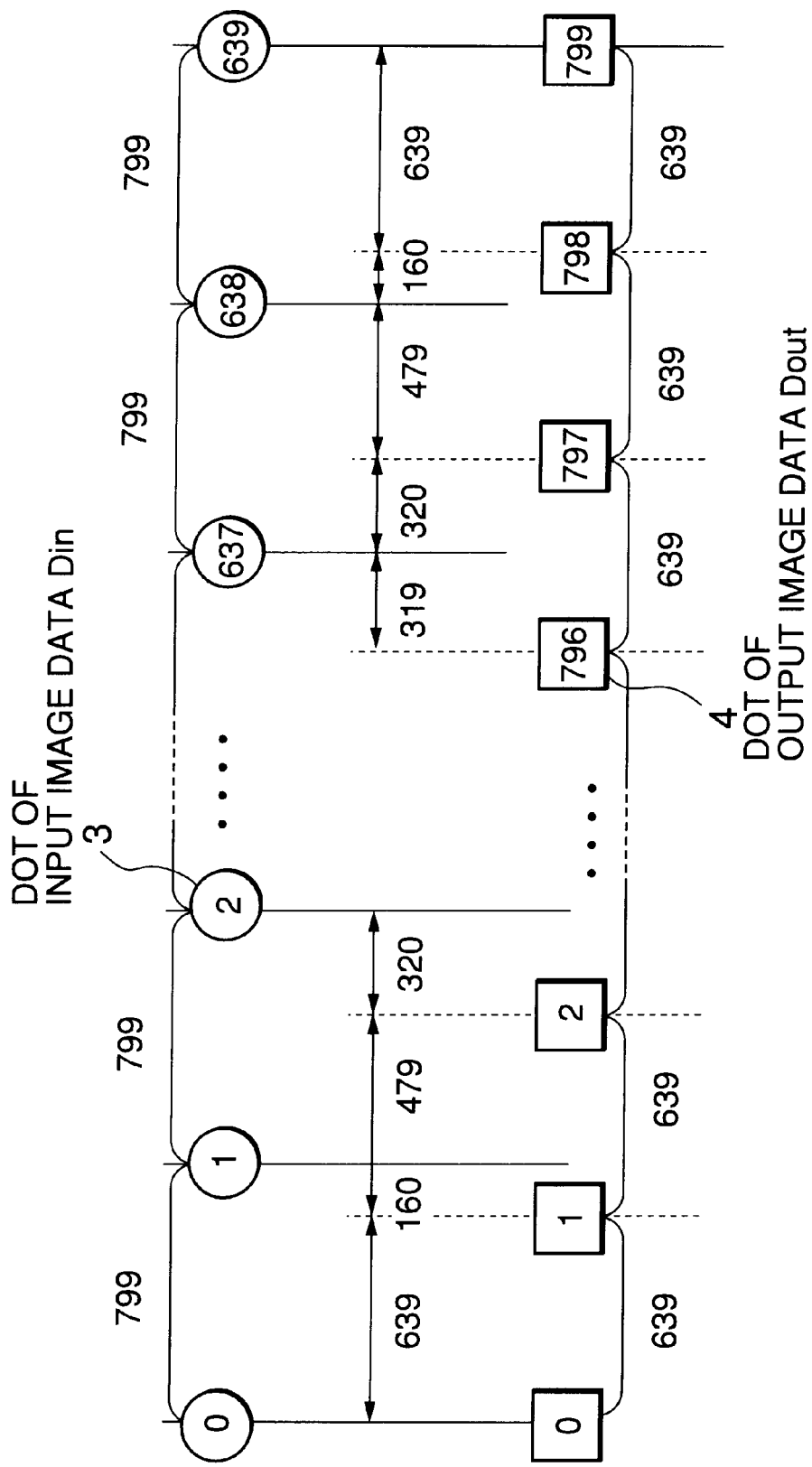
FIG. 4 is a schematic diagram showing a horizontal resolution conversion for scaling up an input image according to the first embodiment.

FIGS. 3 and 4 illustrate a case in which an input image signal Sin has a resolution of "640 dots (horizontal)×480 lines (vertical)" and the matrix display device 50 has a resolution of "800 dots (horizontal)×600 lines (vertical)".

First, an image resolution conversion in the vertical direction is considered. The number Nv of lines of the input image signal Sin is "480" and the number Mv of lines of the matrix display device 50 is "600". In FIG. 3, an external instruction signal Se instructs Nv="480" and Nh="600". The vertical common-coordinate calculating unit 14v sets the 0th line of the input image signal Sin and the 0th line of the matrix display device 50 at a same position, and sets the 479th line of the input image signal Sin and the 599th line of the matrix display device 50 at another same position.

The vertical common-coordinate calculating unit 14v divides each of the input image data Din and the matrix display device 50 by "(Nv−1)×(Mv−1)", namely "(480−1)×(600−1)". The position of every line of the input image signal Sin and the position of every line of the matrix display device 50 can thus be represented in integers. Thanks to this, it can be expressed in integers how far a given line of the matrix display device 50 is from the corresponding line of the input image signal Sin, and a pixel luminance of the line number of the matrix display device 50 can be calculated by a linear interpolation method or the like.

In the example shown in FIG. 3, pixel values Y' of the output image data Dout can be calculated by the following expressions, using pixel values Y of the input image data Din. Here, "Y (line number)" represents a pixel luminance of the line number of the input image signal Sin, and "Y' (line number)" represents a pixel luminance of the line number of the matrix display device 50 (or a virtual luminance of an intermediate image data Dm at a position where a vertical line of the line number of the output image data Dout and a horizontal dot of the dot number of the input image data Din intersect each other).

$$Y'(0)=(Y(0)*599)/599$$

$$Y'(1)=(Y(0)*120+Y(1)*479)/599$$

$$Y'(2)=(Y(1)*240+Y(2)*359)/599$$

$$\ldots$$

$$Y'(598)=(Y(478)*479+Y(479)*120)/599$$

$$Y'(599)=(Y(489)*599)/599$$

It will be recognized that the horizontal image resolution conversion in the horizontal direction also can be performed in the same way.

In FIG. 4, since the number Nh of dots of the input image data Din is "640" and the number Mh of dots of the matrix display device 50 is "800", the external instruction signal Se instructs Nh=640 and Mh=800. The input image data Din and the output image data Dout can be divided as shown in FIG. 4 by dividing each of them by "(Nh−1)×(Mh−1)", namely "(640−1)×(800−1)". The position of every dot of the input image signal Sin and the position of every dot of the matrix display device 50 can thus be represented in integers. From FIG. 4, a pixel luminance at a dot number on the matrix display device 50 is calculated by the following expressions by a linear interpolation or the like. Here, "X (dot number)" represents a pixel luminance of the dot number of the input image signal Sin, and "X' (dot number)" represents a pixel luminance of the dot number of the matrix display device 50. If an arithmetic operation in the vertical direction has been already performed, the value of "(dot number)" may be an already-calculated virtual luminance as the intermediate image data Dm.

$$X'(0)=(X(0)*799)/799$$

$$X'(1)=(X(0)*160+X(1)*639)/799$$

$$X'(2)=(X(1)*320+X(2)*479)/799$$

. . .

$$X'(798)=(X(638)*639+X(639)*160)/799$$

$$X'(799)=(X(639)*799)/799$$

Figure 5:
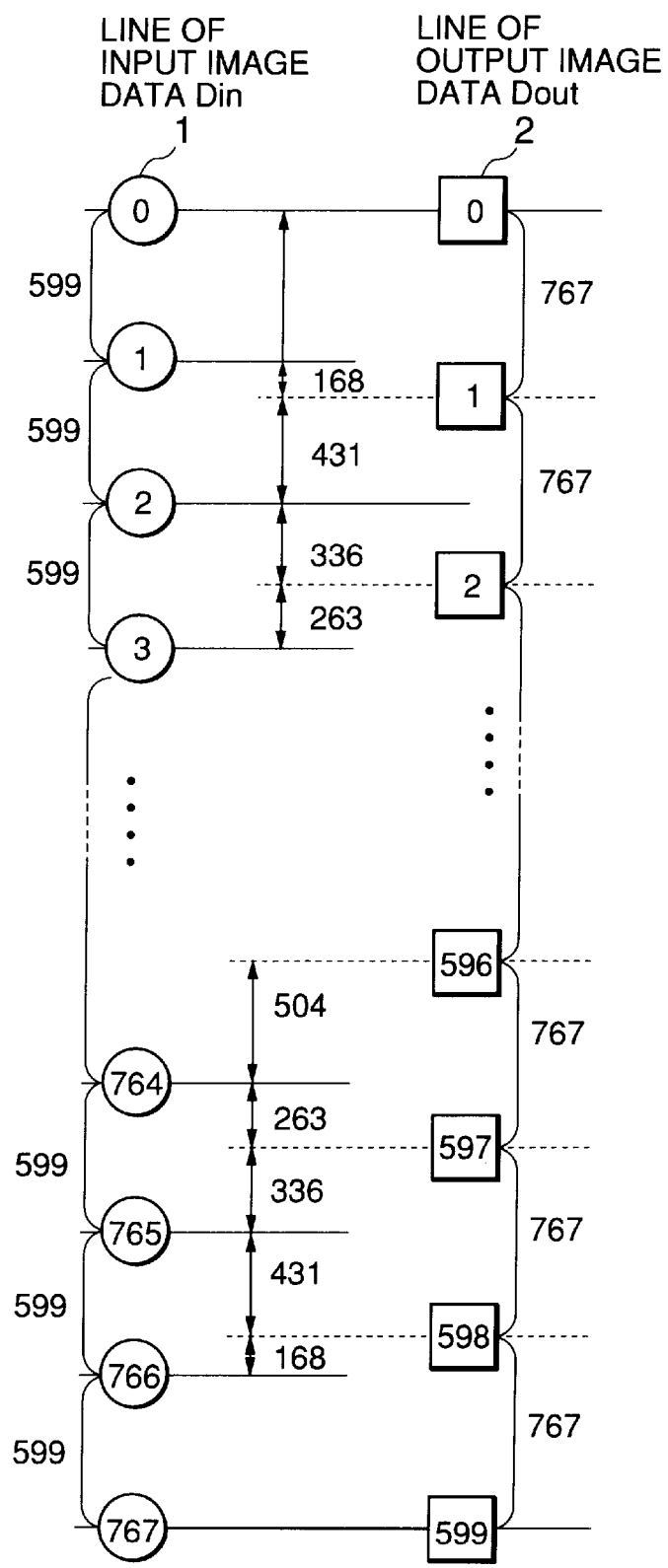
FIG. 5 is a schematic diagram showing a vertical resolution conversion for scaling down an input image according to the first embodiment.
Figure 6:
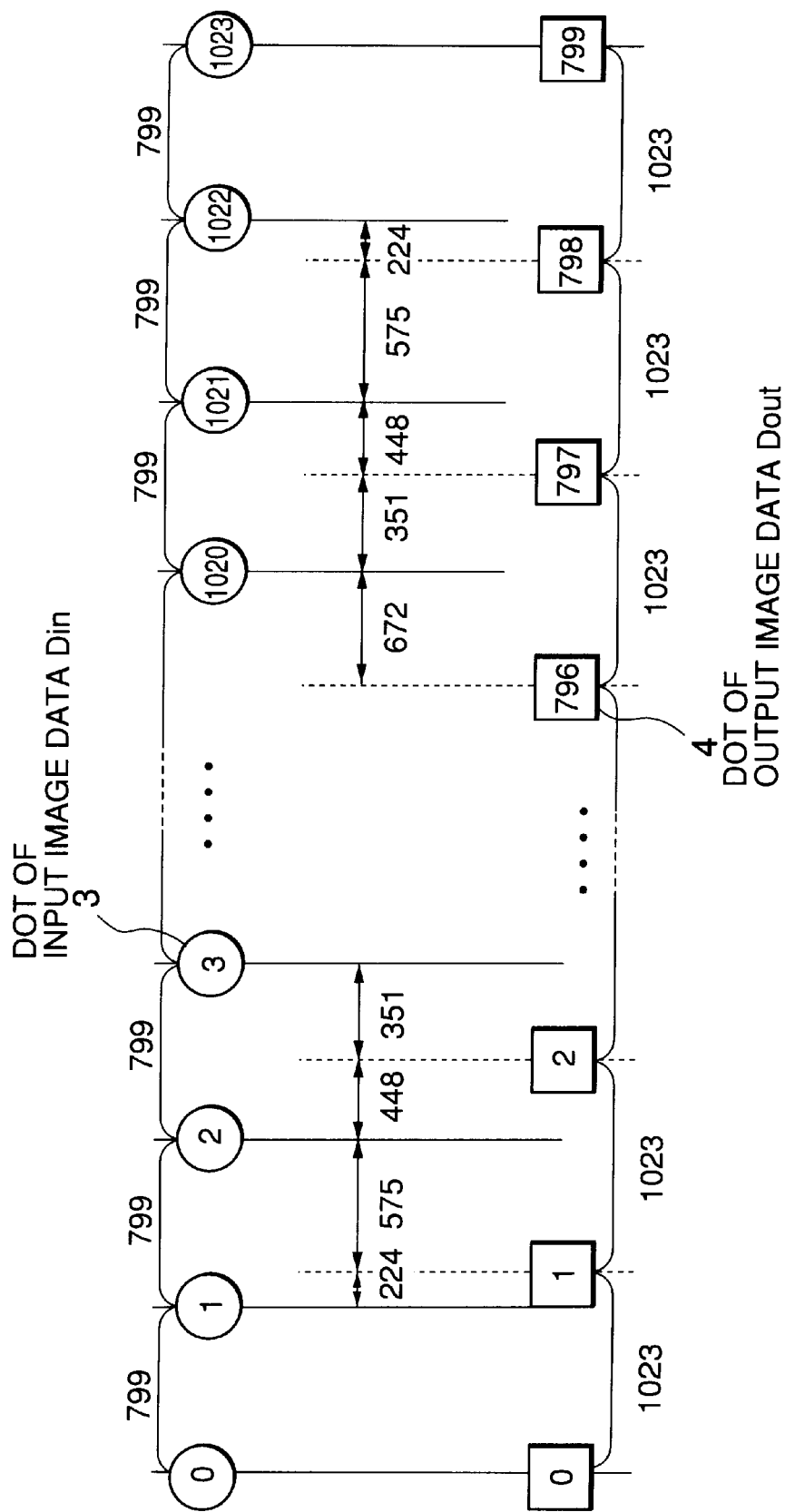
FIG. 6 is a schematic diagram showing a horizontal resolution conversion for scaling down an input image according to the first embodiment.

Next, assume for FIGS. 5 and 6 that the input image signal Sin has a resolution of "1024 dots (horizontal)×768 lines (vertical)" and the matrix display device 50 has a resolution of "800 dots (horizontal)×600 lines (vertical)". The image resolution conversion is processed in basically the same way.

First, an image resolution conversion in the vertical direction is considered. The number Nv of lines of the input image signal Sin is "768" and the number Mv of lines of the matrix display device 50 is "600".

In FIG. 5, the vertical common-coordinate calculating unit 14v sets the 0th line of the input image signal Sin and the 0th line of the matrix display device 50 at a same position, and sets the 767th line of the input image signal Sin and the 599th line of the matrix display device 50 at another same position in the vertical direction. The vertical common-coordinate calculating unit 14v then divides each of the input image data Din and the matrix display device 50 by "(Nv−1)×(Mv−1)", namely "(768−1)×(600−1)" in the vertical direction. The vertical position of every line of the input image signal Sin and the position of every line of the matrix display device 50 can thus be represented in integers. Thanks to this, it can be expressed in integers how far a given line of the matrix display device 50 is from the corresponding line of the input image signal Sin in the vertical direction. A pixel luminance of the matrix display device 50 can thus be calculated by a linear interpolation method or the like. From FIG. 5, a pixel luminance at a line number on the matrix display device 50 can be calculated by the following expressions by a linear interpolation in the vertical direction. Here, "Y (line number)" represents a pixel luminance of the line number of the input image signal Sin, and "Y' (line number)" represents a pixel luminance of the line number of the matrix display device 50.

$$Y'(0)=(Y(0)*599)/599$$

$$Y'(1)=(Y(1)*431+Y(2)*168)/599$$

. . .

$$Y'(2)=(Y(2)*263+Y(3)*336)/599$$

$$Y'(598)=(Y(765)*168+Y(766)*431)/599$$

$$Y'(599)=(Y(767)*599)/599$$

An image resolution conversion in the horizontal direction can also be performed in the same way.

Since the number Nh of dots of the input image data Din is "1024" and the number Mh of dots of the matrix display device 50 is "800", they can be divided as shown in FIG. 6 by dividing each of them by "(Nh−1)×(Mh−1)", namely "(1024−1)×(800−1)". The position of every dot of the input image signal Sin and the position of every dot of the matrix display device 50 can thus be represented in integers. From FIG. 6, a pixel luminance on the matrix display device 50 can be calculated by the following expressions by a linear interpolation method. Here, "X (dot number)" represents a pixel luminance of the dot number of the input image signal Sin, and "X' (dot number)" represents a pixel luminance of the dot number of the matrix display device 50. If "Y' (line number)" has been already calculated, the value of "Y' (line number)" may be taken as the value of "X (dot number)".

$$X'(0)=(X(0)*799)/799$$

$$X'(1)=(X(1)*575+X(2)*224)/799$$

$$X'(2)=(X(2)*351+X(3)*448)/799$$

. . .

$$X'(798)=(X(1021)*224+X(1022)*575)/799$$

$$X'(799)=(X(1023)*799)/799$$

In this way, this embodiment can accurately perform an image resolution conversion even for input images having varying resolutions, and particularly even in case of scaling input images having varying resolutions up or down to output images having varying resolutions.

As described above, according to the first embodiment, it is possible to freely scale up and down the input image signals Sin having varying resolutions and to display the input image signals on a matrix display device having varying resolutions without lacking information of which pixel should be displayed on the matrix display panel.

According to the first embodiment, the common-coordinate generating process generates a common-coordinate system for handling each line/dot of both of the input image and the output image on the basis of the number of lines/dots of the input image and the number of lines/dots of the output image.

Since the absolute-coordinate calculating process obtains the coordinate of a line/dot of the output image using this common-coordinate system, it can be expressed in the absolute-coordinates how far the lines/dots of the output image are from the respective corresponding lines/dots of the input image. The ratio in a positional relation of each line/dot of the output image to each line/dot of the input image can thus be obtained.

The value calculating process obtains the value of a line/dot of the output image from the absolute-coordinate of the line/dot of the output image, for example, when a line/dot of the output image data is between two lines/dots of the input image.

The value of the line/dot of the output image data is obtained by performing a linear interpolation between the values of the two lines/dots of the input image on the basis of the coordinates of the two lines/dots of the input image and the coordinate of the line/dot of the output image, and an image resolution conversion can thus be performed that is high in quality.

Moreover, since this resolution conversion is performed by automatically calculating a common-coordinate even when both the number of lines/dots of an input image and the number of lines/dots of an output image vary differently from one another, it is not necessary to provide a plurality of converting circuit for each resolution.

It is therefore possible to provide an unprecedentedly excellent resolution converting method, apparatus and computer program capable of converting input image signals having various resolutions into any desired output resolution, using only one circuit.

Furthermore, by implementing this image resolution converting method, the first embodiment can provide an unprecedentedly excellent display control apparatus capable of display-controlling a matrix display device having a fixed number of lines/dots by keeping input images having varying resolutions, namely various image sizes, high in quality, and capable of displaying the images scaled up or down at multistage magnifications.

In the second embodiment, in order to prevent the processed numerical values becoming too large, the image resolution conversion is preferably performed by two counters in each direction.

Figure 7:
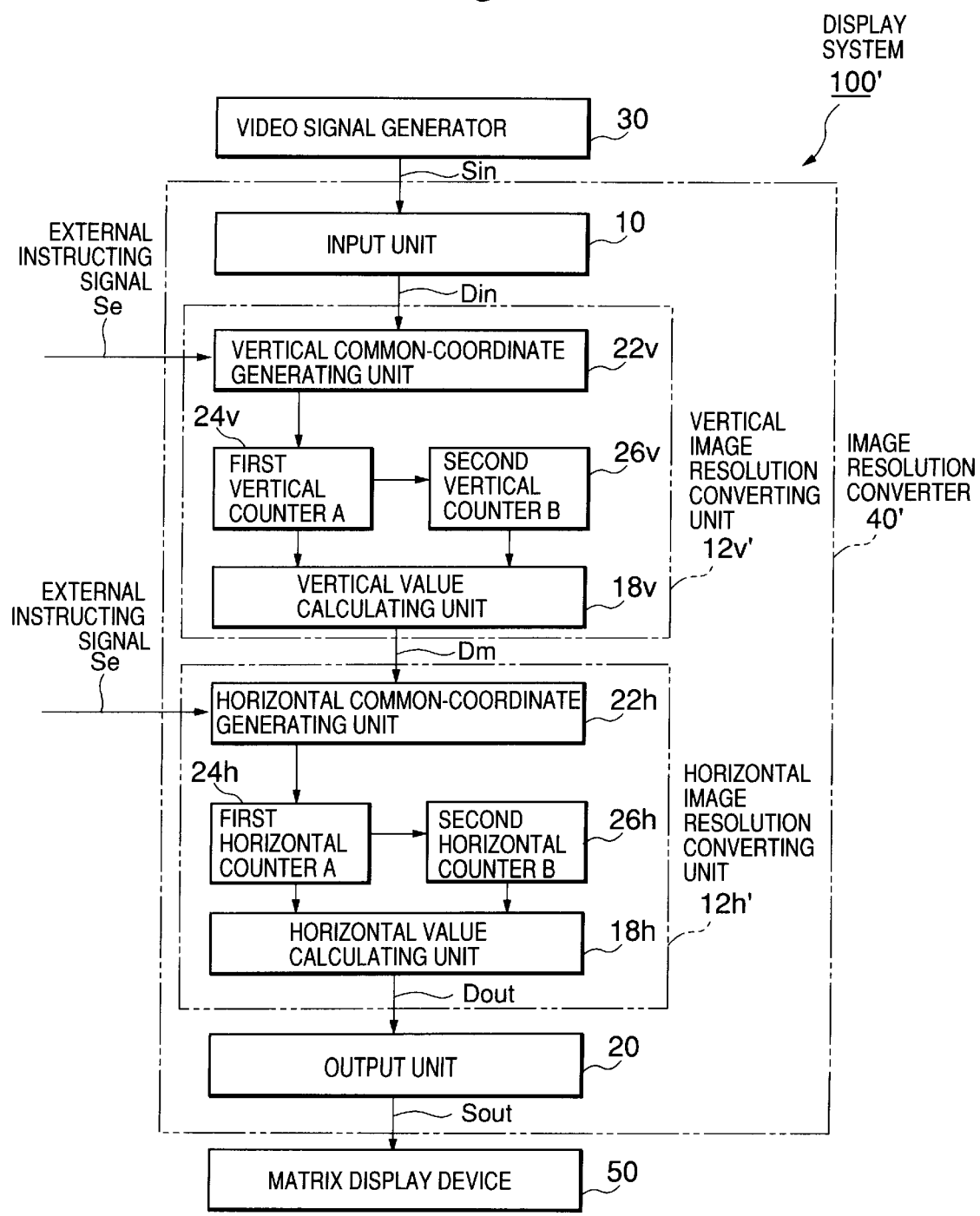
FIG. 7 is a block diagram showing the structure of an image resolution converting apparatus according to a second embodiment of the present invention.

In FIG. 7, a display system 100' has an input unit 10, a vertical image resolution converting unit 12v', a horizontal image resolution converting unit 12h', and an output unit 20, all similar to FIG. 1. The input unit 10 and the output unit 20 have the same structures as the first embodiment.

In the vertical resolution converting unit 12v', the vertical common-multiple calculating unit 22v calculates a vertical common multiple Cv of (Nv−1) and (Mv−1).

The first vertical counter Av (24v) is incremented (Nv−1) each time one pixel is displayed on the matrix display device 50 and from which (Mv−1) is subtracted when the first vertical counter Av (24v) exceeds (Mv−1).

The second vertical counter Bv (26v) is incremented "1" when (Mv−1) is subtracted from the first vertical counter Av (24v).

The vertical value calculating unit 18v calculates a value of the output image data Dout based on the values of the first vertical counter Av (24v) and the second vertical counter Bv (26v).

In the horizontal resolution converting unit 12h', the horizontal common-multiple calculating unit 22h calculates a horizontal common multiple Ch of (Nh−1) and (Mh−1).

The first horizontal counter Ah (24h) is incremented (Nh−1) each time one dot is displayed on the matrix display device 50 and from which (Mh−1) is subtracted when the first horizontal counter Ah (24h) exceeds (Mh−1).

The second horizontal counter Bh (26h) is incremented "1" when (Mh−1) is subtracted from the first horizontal counter Ah (24h).

The horizontal value calculating unit 18h calculates a value of the output image data Dout based on the values of the first horizontal counter Ah (24h) and the second horizontal counter Bh (26h).

The horizontal common-multiple calculating unit 22h calculates a horizontal common multiple Ch of (Nh−1) and (Mh−1).

Next, on the assumption that the number Mv of lines of an input image signal Sin is "480" and the number Nv of lines of a matrix display device 50 is "600", a case of performing an image resolution conversion in the vertical direction is described with reference to FIGS. 8 and 9.

Figure 8:
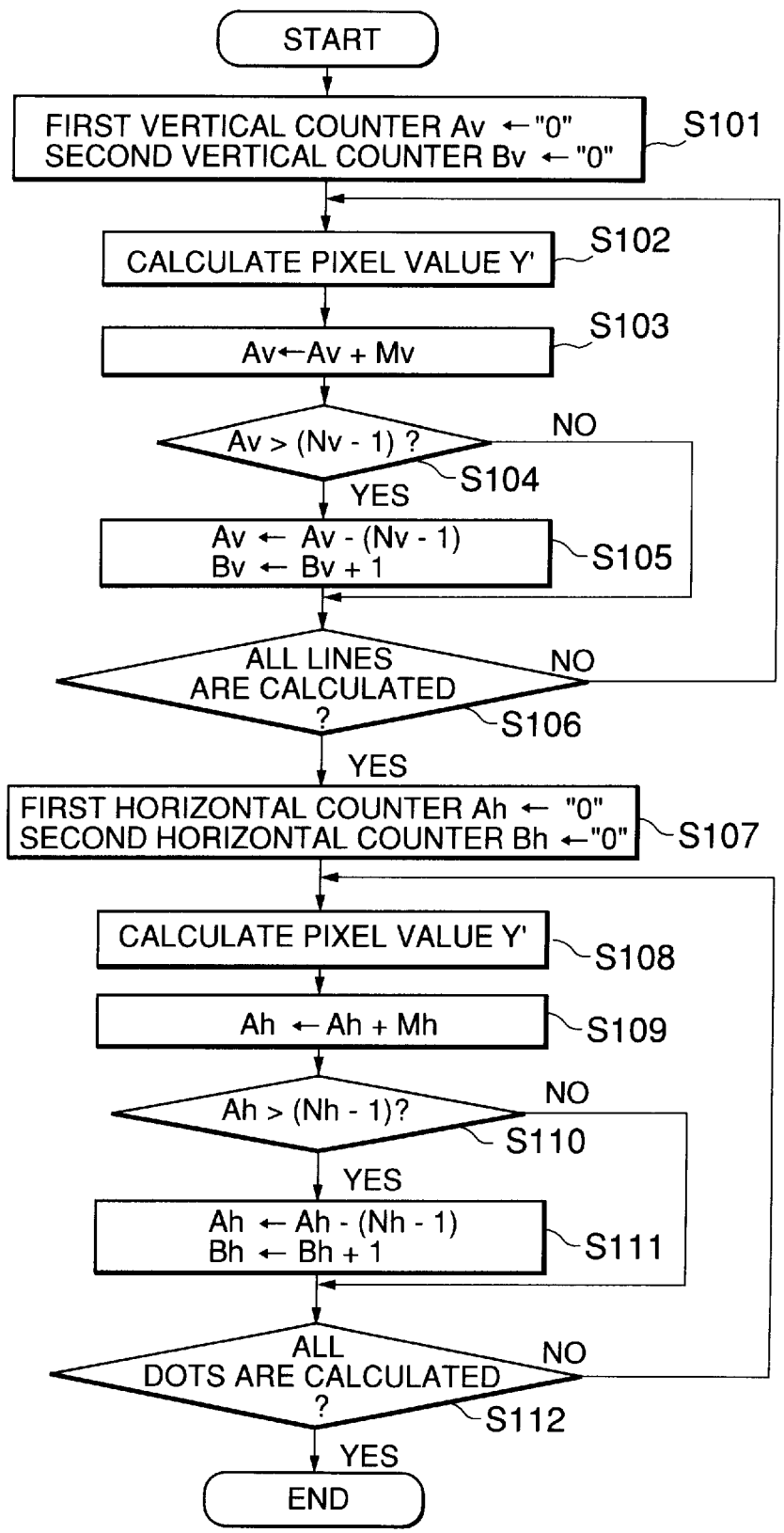
FIG. 8 is a flowchart showing a method of image resolution conversion according to the second embodiment.

In FIG. 8, the first vertical counter Av (24v) and the second vertical counter Bv (26v) are initially set to zero (step S101).

Then the vertical value calculating unit (18v) calculates pixel value Y of the line number by the value of the first vertical counter Av (24v) and the value of the second counter Bv (26v) (step S102).

Each time one line is displayed on the matrix display device 50, (Mv−1) (=(480−1)) is added to the first vertical counter Av (24v) (step S103).

If the value of the first vertical counter Av (24v) is more than (Nv−1)(=(600−1)) (step S104), (Nv−1)(=(600−1)) is subtracted from the first vertical counter Av (24v) and "1" is added to the second vertical counter Bv (26v) (step S105).

Next, the vertical value calculating unit (18v) judges whether all the lines are calculated by determining whether the value outputted by the second vertical counter Bv (26v) is bigger than the number of lines of the output image data Dout. If not, the process returns to step S102. If so, the process progresses to the next step (step S106).

By this operation, the nearest line and the second nearest line of the input image signal Sin to a line to be displayed on the matrix display device 50 are obtained from the second vertical counter Bv (26v), and the separation magnitude of these lines is obtained from the first vertical counter Av (24v).

Next, the first horizontal counter Ah (24h) and the second horizontal counter Bh (26h) are initially set to zero (step S107).

Then the horizontal value calculating unit (18h) calculates pixel value Y of the dot number by the value of first horizontal counter Ah (24h) and the value of second horizontal counter Bh (26h) (step S108).

Each time one line is displayed on the matrix display device 50, (Mh−1)(=(640−1)) is added to the first horizontal counter Ah (24h) (step S109).

If the value of the first horizontal counter Ah (24h) is more than (Nh−1)(=(800−1)) (step S110), (Nh−1) (=(800−1)) is subtracted from the first horizontal counter Ah (24h) and "1" is added to the second horizontal counter Bh (26h) (step S111).

Next, the horizontal value calculating unit (18h) judges whether all the dots are calculated by determining whether the value outputted by the second horizontal counter Bh (26h) is bigger than the number of dots of the output image data Dout. If not, the process returns to step S108. If so, the process ends (step 112).

By this operation, the nearest dot and the second nearest dot of the input image signal Sin to a dot to be displayed on the matrix display device 50 are obtained from the second vertical counter Bh (26h), and the separation magnitude of these dots is obtained from the first horizontal counter Ah (24h).

Next, for FIG. 10 assume that the number Nv of lines of an input image signal Sin is "768" and the number Mv of lines of a matrix display device 50 is "600".

An image resolution conversion for an increasing number of lines as well as an image resolution conversion for a decreasing number of lines as shown in FIG. 10 can be realized by performing in the same process as shown in FIG. 9. An image resolution conversion in the horizontal direction can also be processed in the same way.

As described above, according to the second embodiment, it is possible to freely scale up and down input image signals having varying resolutions and to display the images on a matrix display device without lacking any pixel luminance information which should be displayed on the matrix display device.

According to the second embodiment, a common-coordinate generating process generates a coordinate system for handling each line/dot of both of the input image data and the output image data, and a common-coordinate system on the basis of the number of lines/dots of the output image and the number of lines/dots of the input image.

Since an absolute-coordinate calculating process obtains the coordinate of a line/dot of the output image using this common-coordinate system, it can be expressed in absolute-coordinates how far the lines/dots of the output image are from the respective corresponding lines/dots of the input image. The ratio in a positional relation of each pixel of the output image to each line/dot of the input image can thus be obtained.

A value calculating process obtains the value of a line/dot of the output image from the absolute-coordinate of the line/dot of the output image, for example, in case that a line/dot of the output image is between two lines/dots of the input image.

Since the value of the line/dot of the output image is obtained by performing a linear interpolation between the values of the two lines/dots of the input image on the basis of the coordinates of the two lines/dots of the input image and the coordinate of the line/dot of the output image, an image resolution conversion can be performed that is high in quality.

And moreover since this resolution conversion is performed by automatically calculating a vertical/horizontal common-coordinate even when both the number of lines/dots of an input image and the number of lines/dots of an output image vary differently from one another, it is not necessary to provide a converting circuit for each resolution. And thanks to this, it is possible to provide an unprecedentedly excellent resolution converting method and apparatus and a computer program for converting resolution capable of converting input image signals having various resolutions to output image signals having various resolutions, using only one circuit.

Furthermore, by implementing such an image resolution converting method, the first and the second embodiments can provide an unprecedentedly excellent image resolution converting method and apparatus and a computer program for converting image resolution capable of display-controlling a matrix display device having a fixed number of lines/dots by keeping input images having varying resolutions, namely various image sizes, high in quality, and capable of displaying the images scaled up and down at multistage magnifications.

Moreover, when the external instruction signal is changed, the image resolution can be easily and quickly changed.

In the above-described embodiments, when the processes are operated by a computer software, the image resolution converter 40 may be realized as a combination of a CPU (central processing unit), a memory circuit, and peripheral circuits. The processes are stored as the software program in the memory in advance. The processes are performed by the CPU circuit. Alternatively, the invention may be embodied as a computer-usable data storage medium or carrier wave containing data structures or signals constituting program information for converting a general purpose computer to an apparatus as described above.

In the above-described embodiments, only the cases of the matrix display device having a fixed resolution are described; however, the present invention can apply to matrix display devices having varying resolutions.

Moreover in the above-described embodiments, only the cases of the numbers Nv, Nh, Mv, Mh are designated by the external instructing signal Se; however, the numbers Nv, Nh, Mv, Mh can be detected by the input image signal Sin, the input image data Din, the output image data Dout, or the output image signal Sout, using the common-coordinate calculating unit 14$v$, 14$h$, or the common-multiple calculating unit 22$v$, 22$h$.

Modifications of the invention herein disclosed will occur to a person skilled in the art and all such modifications are deemed to be within the scope of this invention as defined by the appended claims.

What is claimed is:

1. A method for converting an input image having a first resolution to an output image having a second different resolution, comprising the steps of:

accepting an input image signal in the form of a modulated video signal;

converting the input image signal from the modulated video signal to a single frame of an input image;

accepting from a first instruction signal Port an initial vertical number of pixels corresponding to a number of vertical pixels of the input image and a final vertical number of pixels corresponding to a number of vertical pixels of an output image;

accepting from a second instruction signal port an initial horizontal number of pixels corresponding to a number of horizontal pixels of the input image and an final horizontal number of pixels corresponding to a number of horizontal pixels of the output image;

generating a common-coordinate system common to said input image and said output image by relating a number of pixels of said input image to a number of pixels of said output image, said common-coordinate system comprising a first vertical axis equaling the initial vertical number of pixels and a second vertical axis equaling the final vertical number of pixels and a first horizontal axis equal to the initial horizontal number of pixels and a second horizontal axis equal to the final horizontal number of pixels;

calculating absolute-coordinates of said pixels of said input image and said pixels of said output image from said common-coordinate system, calculating values of said pixels of said output image from values of corresponding said pixels of said input image from said absolute-coordinates of said output image, forming an output image having the final vertical and final horizontal number of pixels, and converting the output image to an output image video signal for driving a matrix display device.

2. The method as defined in claim 1, wherein:

said common-coordinate generating step comprises calculating a common multiple of said number of pixels of said input image and said number of pixels of said output image as said common-coordinate system, the common multiple being the quotient of the initial number of horizontal pixels divided into the final number of horizontal pixels, the quotient being other than unity to provide for both scaling up and scaling down.

3. The method as defined in claim 1, wherein:

said value calculating step comprises specifying a value of said output image by a linear interpolation between pixels of said input image based on said absolute-coordinate of each pixel of said output image corresponding to said pixels of said input image.

4. The method as defined in claim 1, further comprising:
displaying said output image video signal on a matrix display device having a number of pixels corresponding to said number of pixels of said output image.

5. The method as defined in claim 1, wherein:
said number of said pixels of said input image and/or said output image is instructed by an external instruction signal.

6. An apparatus for converting an input image having a first resolution to an output image having a second different resolution, comprising:
an input port for accepting an input image signal in the form of a modulated video signal;
an input unit connected to said input port converting the input image signal from the modulated video signal to a single frame of input image;
a horizontal resolution converting unit connected in series to a vertical resolution converting unit and also in series to the input unit,
the vertical resolution converting unit accepting from a first instruction signal port an initial vertical number of pixels corresponding to a number of vertical pixels of the input image and a final vertical number of pixels corresponding to a number of vertical pixels of the output image,
the horizontal resolution converting unit accepting from a second instruction signal port an initial horizontal number of pixels corresponding to a number of horizontal pixels of the input image and a final horizontal number of pixels correspond to a number of horizontal pixels of the output image;
said horizontal and said vertical resolution units comprising
means for generating a common-coordinate system common to said input image and said output image, said common-coordinate system comprising a first vertical axis equaling the initial vertical number of pixels and a second vertical axis equaling the final vertical number of pixels and a first horizontal axis equal to the initial horizontal number of pixels and a second horizontal axis equal to the final horizontal number of pixels;
means for calculating an absolute-coordinate of each pixel of said output image corresponding to said input image from said common-coordinate system, and
means for calculating a value of each said pixel of said output image from a value of a corresponding pixel of said input image from said absolute-coordinate of each pixel of said output image; and
an output unit connected in series with said horizontal and said vertical resolution units forming an output image having the final vertical and final horizontal number of pixels and converting the output image to an output image video signal for driving a matrix display device.

7. The apparatus as defined in claim 6, wherein;
said common-coordinate generating means, said absolute-coordinate calculating means, and said value calculating means control resolution conversion in a vertical direction by relating a number of lines in the vertical direction of said input image to a number of lines in the vertical direction of said output image,
the relating being the quotient of the initial number of vertical pixels divided into the final number of vertical pixels, the quotient being other than unity to provide for both scaling up and scaling down.

8. The apparatus as defined in claim 6, wherein;
said common-coordinate generating means, said absolute-coordinate calculating means, and said value calculating means control resolution conversion in a horizontal direction by relating a number of dots in the horizontal direction of said input image to a number of dots in the horizontal direction of said output image,
the relating being the quotient of the initial number of horizontal pixels divided into the final number of horizontal pixels, the quotient being other than unity to provide for both scaling up and scaling down.

9. An apparatus for converting an input image having a number Nv of lines in the vertical direction to an output image having a number Mv of lines in the vertical direction, comprising:
means for calculating a vertical common multiple Cv of (Nv−1) and (Mv−1);
means for calculating an absolute-coordinate of each pixel of said output image using said vertical common multiple Cv as a vertical common-coordinate system; and
means for calculating a value of a pixel of said output image from the value of a corresponding pixel of said input image based on said absolute-coordinate values of said output image.

10. An apparatus for converting an input image having a number Nh of dots in the horizontal direction to an output image having a number Mh of dots in the horizontal direction, comprising:
means for calculating a horizontal common multiple Ch of (Nh−1) and (Mh−1);
means for calculating an absolute-coordinate of each pixel of said output image using said horizontal common multiple Ch as a common-coordinate system; and
means for calculating a value of a dot of the output image from the value of a corresponding dot of the input image based on said absolute-coordinate values of said output image.

11. An apparatus for converting an input image having a number Nv of lines in the vertical direction to an output image having a number Mv of lines in the vertical direction, comprising:
means for calculating a vertical common multiple Cv of (Nv−1) and (Mv−1);
a first vertical counter to which (Nv−1) is added each time one line is displayed on said output image and from which (Mv−1) is subtracted when said first vertical counter exceeds (Mv−1);
a second vertical counter to which "1" is added when (Mv−1) is subtracted from said first vertical counter; and
means for calculating a value of said output image based on values of said first vertical counter and said second vertical counter.

12. An apparatus for converting an input image having a number Nh of dots in the horizontal direction to an output image having a number Mh of dots in the horizontal direction, comprising:
means for calculating a horizontal common multiple Ch of (Nh−1) and (Mh−1);
a first horizontal counter to which (Nh−1) is added each time one dot is displayed on said output image and from which (Mh−1) is subtracted when said first horizontal counter exceeds (Mh−1);
a second horizontal counter to which "1" is added when (Mh−1) is subtracted from said first horizontal counter; and
means for calculating a value of said output image based on values of said first horizontal counter and said second horizontal counter.

* * * * *